United States Patent
Alameh et al.

(10) Patent No.: US 10,678,940 B2
(45) Date of Patent: Jun. 9, 2020

(54) EVENT MEDIA DISTRIBUTION

(71) Applicant: Motorola Mobility LLC, Chicago, IL (US)

(72) Inventors: Rachid Alameh, Chicago, IL (US); Zhengping Ji, Chicago, IL (US); Christian Flowers, Chicago, IL (US); James Wylder, Chicago, IL (US); Jarrett Simerson, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 265 days.

(21) Appl. No.: 15/858,544

(22) Filed: Dec. 29, 2017

(65) Prior Publication Data

US 2019/0205562 A1    Jul. 4, 2019

(51) Int. Cl.
*H04W 8/00*  (2009.01)
*H04W 4/20*  (2018.01)
*H04W 4/02*  (2018.01)
*G06F 21/62*  (2013.01)
*G06F 3/0484*  (2013.01)

(52) U.S. Cl.
CPC .......... *G06F 21/6245* (2013.01); *H04W 4/02* (2013.01); *H04W 4/20* (2013.01); *H04W 8/005* (2013.01); *G06F 3/04842* (2013.01)

(58) Field of Classification Search
CPC .................................. H04W 4/02; H04W 4/20
See application file for complete search history.

(56) References Cited

U.S. PATENT DOCUMENTS

| | | | | |
|---|---|---|---|---|
| 8,051,452 B2* | 11/2011 | Arseneau | ............. | G06F 1/1626 725/37 |
| 8,683,566 B1* | 3/2014 | Gailloux | ................. | G06F 21/31 726/3 |
| 9,185,063 B1* | 11/2015 | Kumar | .................... | H04L 51/36 |
| 9,589,255 B1* | 3/2017 | Sandrew | ............ | G06Q 10/1093 |
| 10,460,083 B2* | 10/2019 | Baldwin | ................. | G06F 21/10 |
| 2009/0193087 A1* | 7/2009 | Lee | ....................... | G06Q 10/109 709/206 |
| 2012/0324002 A1* | 12/2012 | Chen | ...................... | G06Q 50/01 709/204 |
| 2013/0103765 A1* | 4/2013 | Papakipos | ............. | G06Q 50/01 709/206 |
| 2013/0262686 A1* | 10/2013 | Hill | ..................... | H04L 65/1069 709/228 |
| 2015/0172855 A1* | 6/2015 | Mishra | ................. | H04W 4/023 455/418 |

(Continued)

*Primary Examiner* — Ali Shayanfar
(74) *Attorney, Agent, or Firm* — McKinney Phillips LLC; Phillip Pippenger (57) ABSTRACT

Systems and methods for providing event media distribution associated with an event to a user include receiving an electronic invitation to the event having a time and location associated therewith and displaying the electronic invitation, including a response option and one or more mode options. The mode options are associated with one or more rules regarding automatic sharing of media associated with the event. The user may give an affirmative response that they will attend, as well as a selection of one or more mode options. When user of the mobile communications device is present at the event, the user device shares information to and from the devices of other attendees in accordance with the selected mode option(s).

14 Claims, 5 Drawing Sheets

(56) References Cited

U.S. PATENT DOCUMENTS

| | | | |
|---|---|---|---|
| 2016/0005007 A1* | 1/2016 | Marsico | G06Q 10/20 |
| | | | 705/305 |
| 2016/0294894 A1* | 10/2016 | Miller | G06F 16/24578 |
| 2017/0118165 A1* | 4/2017 | Kumar | G06F 16/27 |
| 2017/0345236 A1* | 11/2017 | Kuenzi | G07C 9/00571 |
| 2018/0004714 A1* | 1/2018 | Munoz | H04N 21/26258 |
| 2019/0205562 A1* | 7/2019 | Alameh | H04W 4/02 |

\* cited by examiner

EVENT MEDIA DISTRIBUTION

TECHNICAL FIELD

The present disclosure is related generally to mobile electronic communications devices and, more particularly, to systems and methods for providing a fuller party experience via a mobile electronic communications device.

BACKGROUND

Users of mobile communications devices such as cell phones and smart phones tend to conduct a large part of their social life via their device. This extends to receiving and responding to requests to attend functions such as parties and gatherings. However, the user's response to an invitation typically does nothing to enhance the event beyond aiding the organizer in planning for event attendance.

Before proceeding to the remainder of this disclosure, it should be appreciated that the disclosure may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, mobile electronic devices are adept at gather subject material for providing a robust sharing experience. However, the complexities of scheduling and synchronizing devices often lead instead to a less than ideal experience. For example, while a user may capture an image or video of interest to a group of people based on a common social experience, the user needs to then take a number of nonintuitive steps in most systems to ensure sharing of the correct material to the correct audience.

In an embodiment of the disclosed principles, a broad system level seamless interface and services are provided for a party setting. The services enable discovery of new users, privacy consent, communication, device-device and device-cloud interface and access, authenticating, capturing, notifying, and sharing. In an embodiment, the sending of invites enables devices discoverability, credential sharing, privacy consent, device-to-device, and device to cloud communication. Users are notified who accepted, who did not, and who is at the party location. With respect to unknown contacts (e.g., new users) a discovery mode allows such users to participate as well.

Users are able to seamlessly grant permissions regarding privacy, sharing, recordings and access to social sites when accepting the invitation to be fulfilled when the user arrives at the actual event. Invitations may be issued and accepted via social media sites, emails, messaging, hangouts and calendar events and may automatically give the user an option to make the invitee device discoverable for connecting and sharing with friends at the party, including options such as privacy consent to record events, share credentials, and share on social sites Consenting users make their devices discoverable at the party, which means that their location is sharable but only at the time and place of the party, not before or after. Verification of the party location may be based on GPS, cellular transmissions or BT (Bluetooth)/WiFi activity for example. The devices of consenting users are paired with the host device when at the party location and may then share. User audio or visual profile samples may be stored or shared.

With respect to detecting a party setting, the device may gather context cues such as location, date, time, various voices paired with invited users' names (e.g., identifying people via prior device engagements, matching voice to image, image recognition) pictures), Bluetooth, imaging (e.g., facial recognition or depth profiling), keywords associated with parties, sounds associated with parties (e.g., music, drinks, plates, laughter) and objects, audio loudness, background noise (e.g., via voice analysis, speech to text, etc.) and so on. The host device collects audio and visual material during the party, and, either at the end of party or in an ongoing manner, uploads key events to user social sites or otherwise delivers the material to all consenting users so that all may see and experience the highlights of the party.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
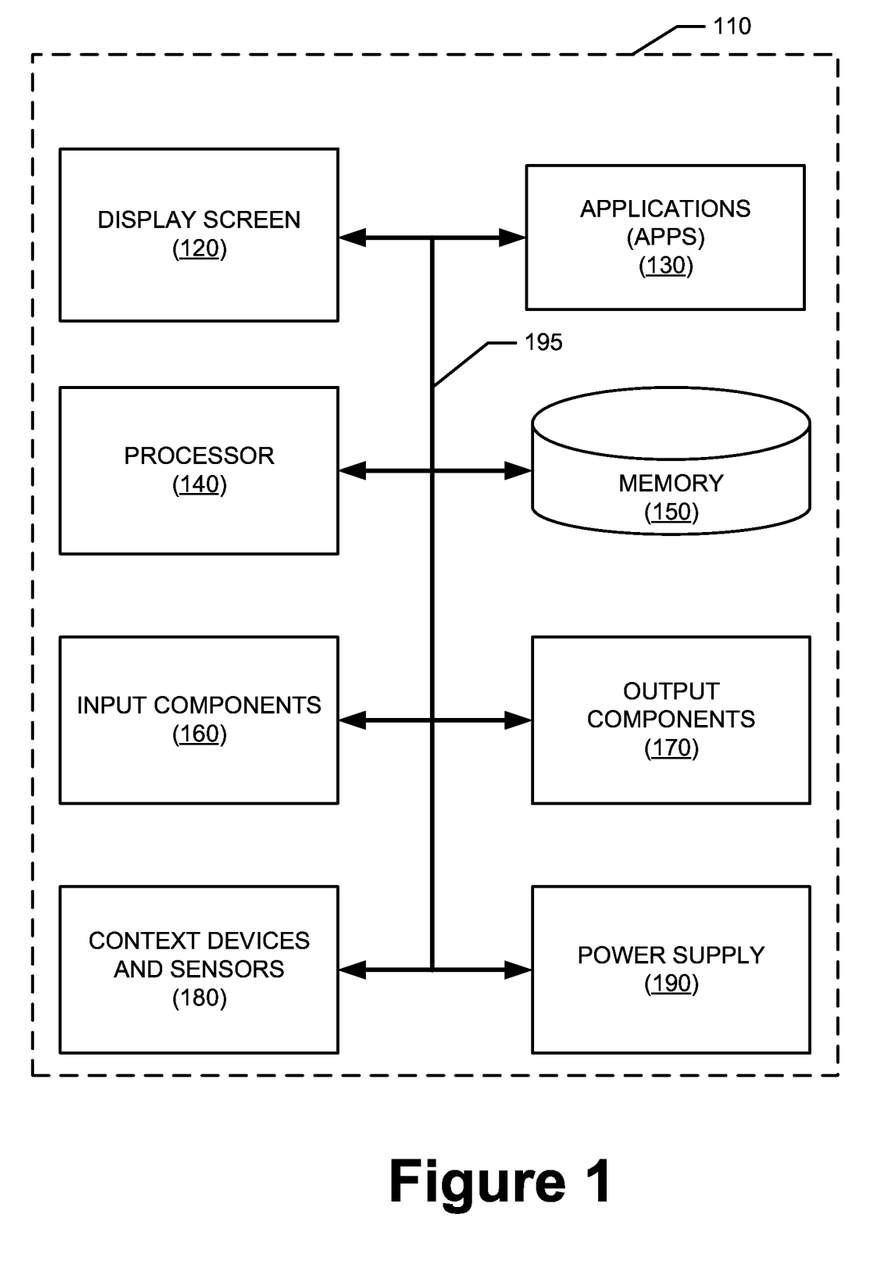
FIG. 1 is a general schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be any of a microprocessor, microcomputer, application-specific integrated circuit, and the like. For example, the processor 140 can be implemented by one or more microprocessors or controllers from any desired family or manufacturer. Similarly, the memory 150 is a nontransitory media that may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to presence detection and authentication.

One or more context devices and sensors 180 provide presence detection and recognition, depth detection imagers, RGB imagers, audio detection and recognition, radio frequency (RF) detection and recognition, and other capabilities as needed to determine whether the device is at a scheduled party (e.g., time and place match invitation, sounds and background fit expectations, etc.), which invitees are present, what occurrences may be of interest, and so on.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

Figure 2:
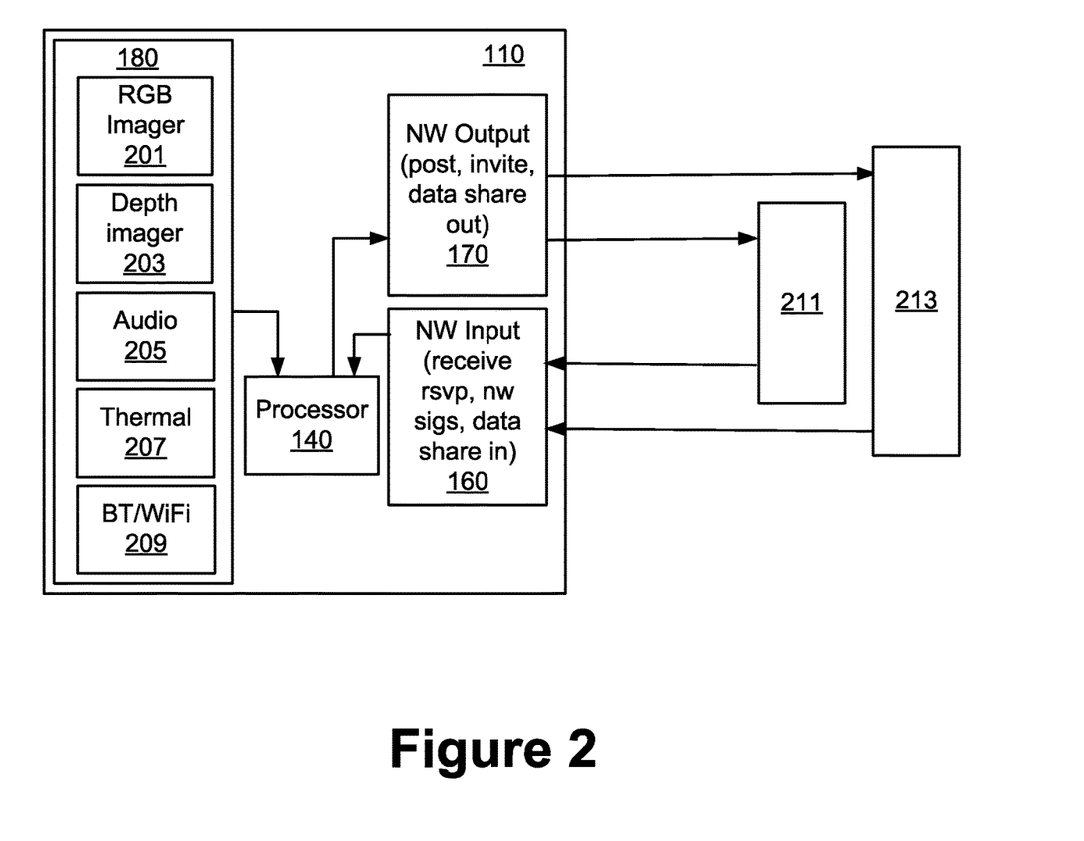
FIG. 2 is functional diagram of functions executed by the device during operation and their interrelationships in accordance with an embodiment of the described principles.

FIG. 2 is functional diagram of functions executed by the device during operation and their interrelationships in accordance with an embodiment of the described principles. It will be appreciated that the illustrated units are functionally grouped, and that certain physical devices or systems may perform multiple functions and that certain logical functions may be performed by multiple physical devices or systems. For example, a network card may perform both a logical network transmission function and a logical network reception function. Similar, an audio sensor function may be performed by a device microphone input that is also used for speech input.

In the illustrated embodiment, the device 110 of FIG. 1 is shown in an abstracted state to focus on the components of most interest for the present discussion. Within the device 110, and corresponding to the device context devices and sensors 180, a number of sensors and dual use sense capable systems are shown. In the illustrated embodiment, these include an RGB (red, green, blue) imager 201, e.g. a camera, as well as a depth imager (e.g., a time-of-flight or other type system such as stereo, structured light, scanning, etc.), an audio sensor (e.g., a microphone), a thermal sensor (e.g., a thermopile or other presence detection sensor), and a network sensor (e.g., for gathering device data from other devices over a network).

These various sensors and systems are linked to and coordinated by the device processor 140. The processor 140 is linked directly or indirectly to network output facilities 170 and network input facilities 160. It will be appreciated that the device 110 may communicate over multiple networks simultaneously or otherwise, and that the networks may include short range protocols such as Bluetooth, medium range protocols such as WiFi and long range protocols such as LTE or other cellular or non-cellular long range protocols.

In the illustrated embodiment, the network output facilities 170 may be used by the processor 140 for multiple tasks, such as sending others invites to an event such as a party, sharing data out while at a party (e.g., for notifying other consenting users of this user's arrival), and sharing media data for later hosting (e.g., audio or video recordings etc.).

Similarly, the network input facilities 160 may be used by the processor 140 for receiving invitations, receiving responses to this user's outgoing invitations, receiving shared data, whether device data or media data, and other tasks.

Figure 3:
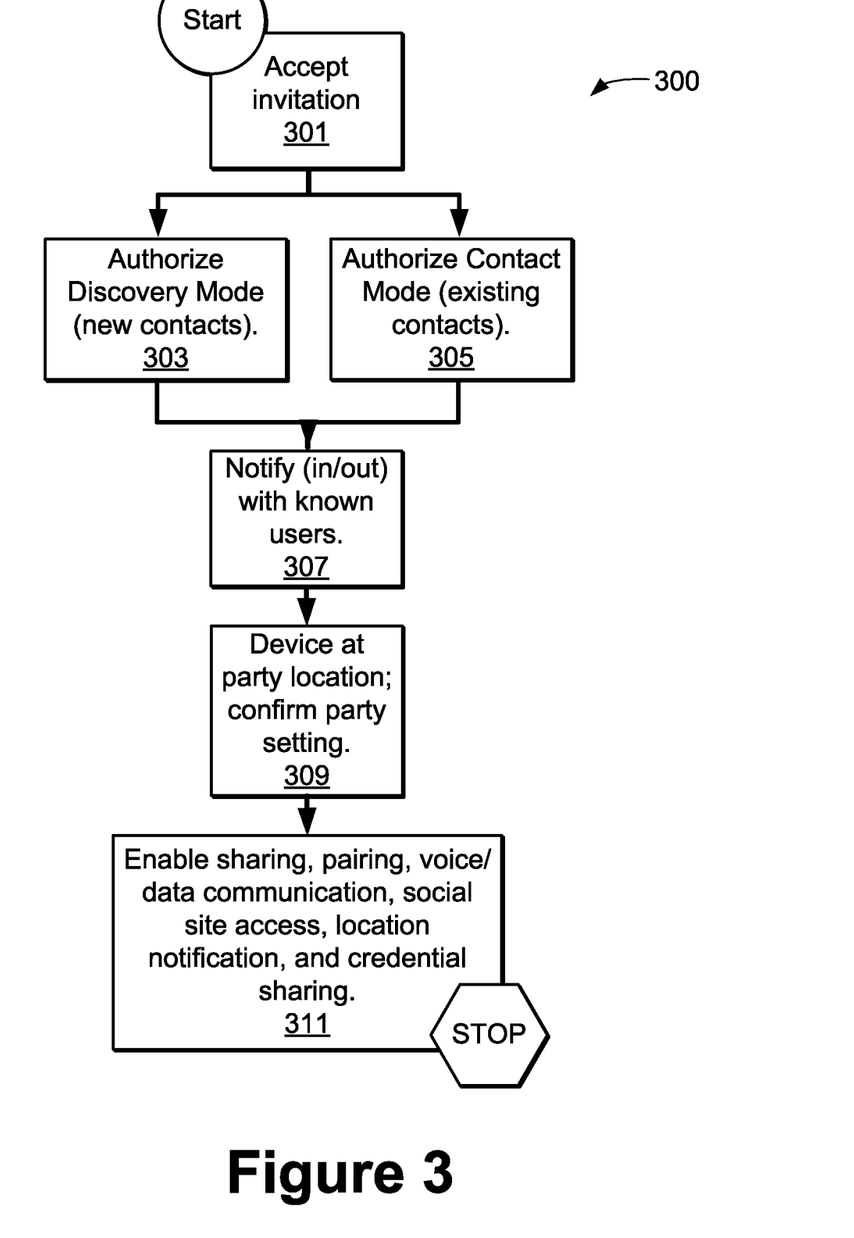
FIG. 3 is a process flow chart in accordance with an embodiment of the disclosed principles, wherein the user authorizes sharing and requests notifications when accepting the invitation.

FIG. 3 is a process flow chart in accordance with an embodiment of the disclosed principles, wherein the user authorizes sharing and requests notifications when accepting the invitation, and wherein the host's device completes enablement and authorization actions at the party based on the device location and date/time combination.

This embodiment pertains to management of privacy consent, allowing notification, sharing, and communicating with known and unknown people invited to the party by responding to a party invitation. Much of these actions are initiated during the acceptance event but complete fulfillment is postponed until the user is at the party location and time.

The illustrated process 300 begins at stage 301 with the user receiving and accepting a party invitation. The party invitees may include both known and unknown people, and party invitations may be issued via a social site posting, a calendar event, or an email (either standing alone or providing a link to a site) for example. Once the user accepts the event (such as responding to a social site or transmitting an RSVP), the user grants permissions by responding to interactive interface following invitation acceptance. The interface gives the user options pertaining to sharing, notifying, communicating, and giving privacy consent.

In greater detail, the user chooses at stages 303 and 305 in which mode the user wishes to engage the other attendees. At stage 303, the user authorizes a discovery mode, meaning that the user's device will discover new contacts and be discoverable by such contacts. In an embodiment, the user can select both "contact" and "discoverable" modes one after the other. In an embodiment the contacts mode allows contact with people known to the user, while the discovery mode allows contact with people the user has not met.

If the user agrees to the discovery mode the device will present options regarding authorization. For example the user may be asked whether they wish to broadcast the MAC (media access control) Address, and if the user responds in the affirmative, the user device switches to discovery mode (once at the party location) and broadcast its Mac address. The user may also be asked if they would like to allow social site access. If the user responds in the affirmative, the user agrees to add new contacts to the social site for event sharing and future communication.

Similarly, the user may choose to share their credentials, and if so, the user device is authorized to share facial and voice segments sample with new contacts/unknown people. Photo sharing may also be authorized, in which case the user device is authorized to establish Bluetooth communication with other devices to share photos or other information.

Regarding the contact mode at stage 305, if the user authorizes only the contact mode, this means that the user's device will not be discoverable by new contacts but will communicate with existing contacts. The device may present further options upon the user selecting the contact mode. For example, the user may elect to share the geo location of their device, which represents the user's authorization to their device to share the user's location at the event with his contacts, thus helping existing friends/family members/couples arrange their time and/or find each other and gather together at the event. The user may agree to enable the device microphone, thus enabling the recording of user talk and the extraction of relevant information without the device being in a phone call. For example, when a person is introduced, useful contact information like name, title and company may be captured through the mic. This information may be extracted and shared with people authorized, avoiding the hassle of manually inputting contact data, and may enable person-to-person communication within a registered circle.

For example, a user may ask (regarding another invitee) "Rachid, where are you, send me the location." "Tom, do you have time there? Let's meet at reception desk." "All, let's gather at the gate." This kind of information is processed and sent to the corresponding person referred to, resulting in a pop up confirmation on the requesting device and a pop up notice on the target's device, e.g., "Location sent to Zhengping" or "Zhengping is asking for a meet."

The user may also be asked to permit Bluetooth Pairing, which would allow the user's device to seamlessly establish Bluetooth connection/pairing at the scene for communication and photo sharing. Permissions with unknown users may also be granted, allowing the user's device to explore new friends and establish new connections regarding the party.

Regardless, the process 300 then flows to stage 307, wherein the device sends and receives notification to and from known users who are also invitees regarding planned attendance. In particular, once the user accepts the event, others who also accepted the event will be automatically notified that user accepted, and the user will be notified of who in his contact list has accepted the invitation and their planned arrival times and specifics notes requests.

Until the party starts, no further outgoing communications are necessary, although notifications from other newly accepting users may continue to arrive. At the time and date of the party, with the user device user at the party location (stage 309), those from the accepted list who have already arrived at the party location are automatically highlighted to the user.

The user's device also attempts to confirm that it is actually in a party setting. Consider for example a party that is scheduled to start at 6 PM on a particular date in a particular place, and suppose the user device (and user) arrive at the location two hours late (or he is at the right location but wrong room), i.e., at 8 PM. While the party is likely ongoing, this cannot be taken for granted. As such, the device senses its context to infer the existence or nonexistence of a party.

The user device may apply a number of techniques to determine if it is in a party context. The first technique is simply to ensure that the current location and date/time match event details in previously sent messages, emails, calendar events, social sites and so on. The device may also detect key audible signals, that is, sounds that are typical of a party context. For example, the device mic may capture laughter, key spoken words such as names, drinks, beer, wine, and cakes, or other key sounds in the background, e.g., sounds of glass, plates, and utensils, singing happy birthday, etc. Further, the device may associate recognized voices with invitees who accepted the invitation.

The detection of a large number of different voices is also indicative of a crowd such as may be present at a party. Thermal or depth detection of a large number of people may also be used to infer the presence of a crowd. The depth detection may be time of flight (TOF), structured light or stereo imaging, and may map area walls and people and their relative locations from the device (range and angle) as well as pose (sitting, walking).

The RGB imager may be activated initially or may be awakened after one or more of the foregoing techniques indicate the likely presence of a party, and may then assess the context to verify party indicia, e.g., a crowd in a localized area, people, drinks and glasses, customs, tables, plates, utensils, and so on. At stage 311, following confirmation of the party setting, the user device enables sharing, pairing, voice/data communication, social site access, location notification, and credential sharing as appropriate.

Figure 4:
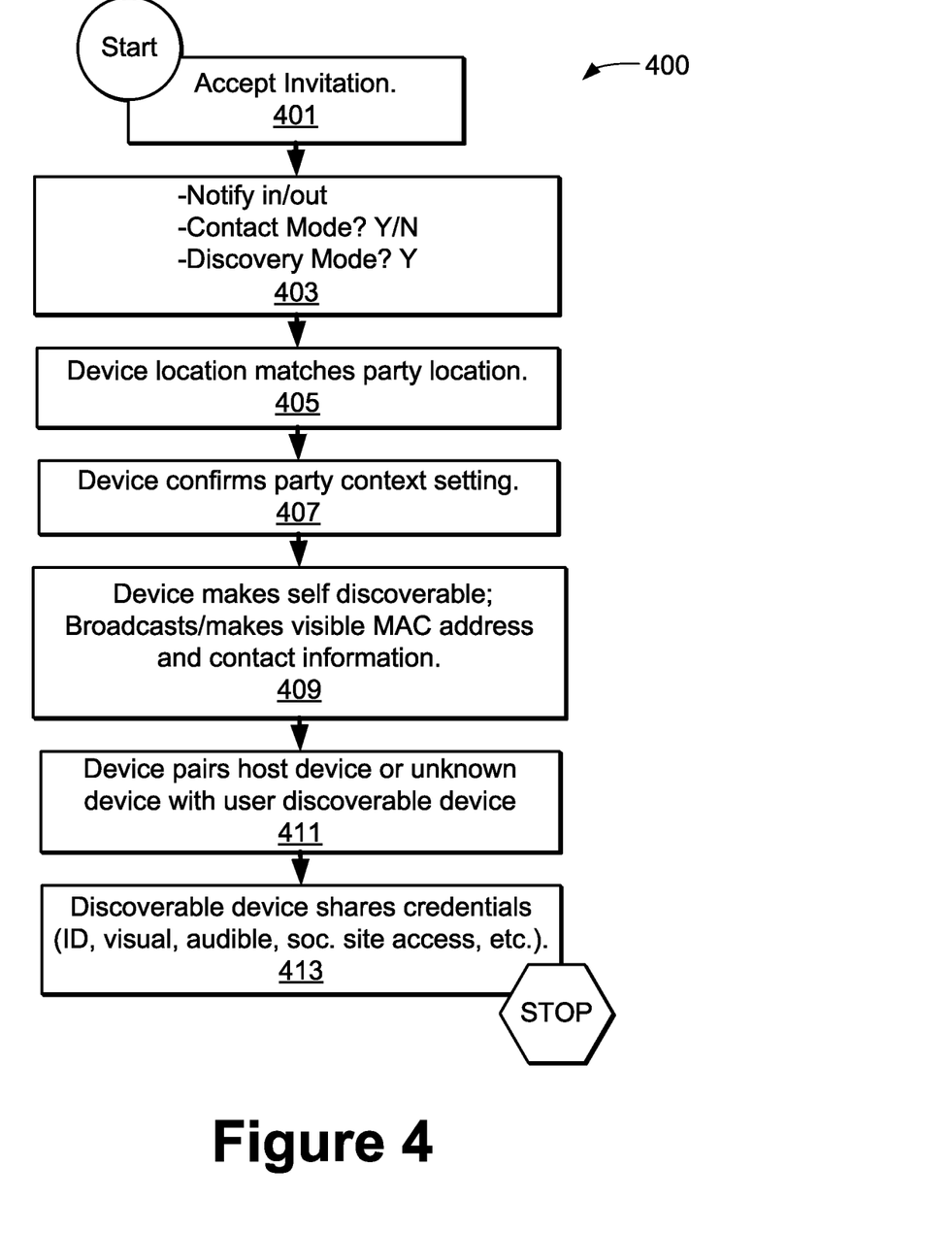
FIG. 4 is a process flow chart of an example device discovery process 400 in accordance with an embodiment of the disclosed principles.

FIG. 4 is a process flow chart of an example device discovery process 400 in accordance with an embodiment of the disclosed principles. The process 400 begins at stage 401 with user acceptance of a received invitation to a gathering event such as a party. At stage 403, the user's device presents a number of options to the user and receives user selections regarding notifications and mode (e.g., contact mode, discovery mode). In this example, the user gives an affirmative response with respect to at least the discovery mode.

At stage 405 of the process 400, the user's device detects that the date and time are within the specified date and time for the party and that the device's location matches the scheduled party location. The device proceeds to confirm that the surroundings are indicative of a party at stage 407, e.g., using context cues as discussed above.

Since the user selected the discover mode when accepting the invitation, the device makes itself discoverable at stage 409, and broadcasts or otherwise makes visible its MAC address and contact information. In the illustrated example, the user's device then pairs at stage 411 with any of the event host's device and any unknown devices that are also set be discoverable (and close enough to enable discovery). Upon pairing, the user's device at stage 413 shares credentials (ID, user image, voice sample, social site data access, etc.) with the other paired device(s).

Figure 5:
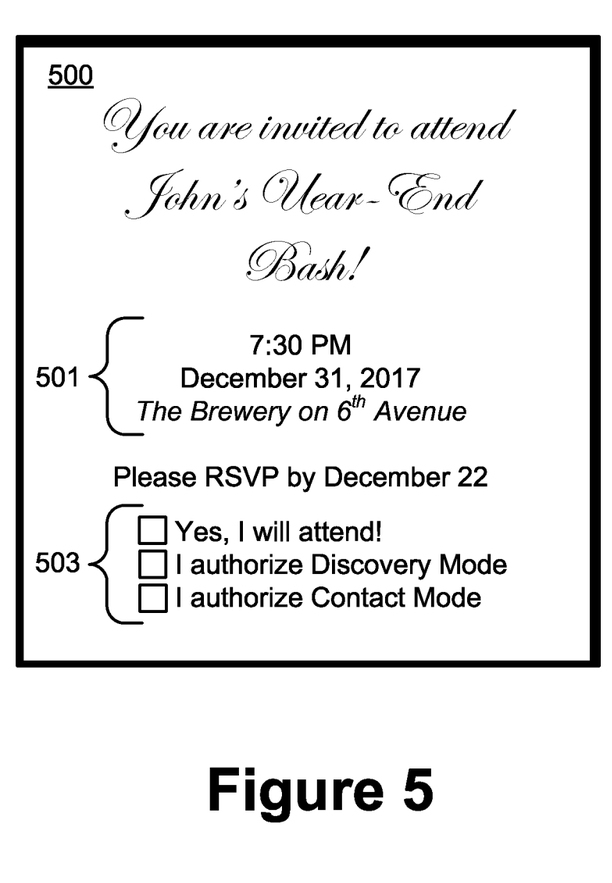
FIG. 5 is an example user interface for invitation acceptance in accordance with an embodiment of the disclosed principles.

Although no specific interface is required to operate the user device with respect to invitation acceptance, FIG. 5 shows an example user interface for responding to an event invitation in accordance with an embodiment of the disclosed principles. In the illustrated embodiment, the invitation 500, which may be displayed on a user device screen or another device screen associated with the user, comprises an event title 501. The invitation 500 also includes an event data field 503 and an RSVP field 505. As can be seen, in the illustrated embodiment, the RSVP field 505 includes three selectable options including an acceptance option and two dependent options, namely authorizations for the discovery and contact modes.

As noted above, in the event of selection of the acceptance option and either dependent option, the device may present further options to the user, such as what types of information the user wishes to share and which device capabilities the user wishes to enable during the event.

During the party or other event, the user's device recognizes and captures key events for later sharing with those who consented when accepting the invitation or at the scene. For example, in an embodiment, the user device recognizes and records attention-grabbing spoken words, monitors conversation and recognizes story telling (one voice speaking while all listening), recognizes Happy Birthday singing, recognizes sudden quiet, and recognizes other indicia of meaningful events. The device captures these events for sharing to social sites with consenting attendees.

When any device that has consented to sharing is detected to be leaving or to have left the party setting, all data captured on that device are sent, uploaded, and shared with others who have consented. Sharing may also occur during the event or after the event as desired.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile communications device for providing event media distribution associated with an event to a user, the device comprising:
a display;
a network connection;
a processor configured to receive at the mobile communications device an electronic invitation to the event, the event having a time and location associated therewith, and at least partly in response to receiving the invitation, to cause a response option and one or more mode options to be displayed on a display, each mode option being associated with one or more rules regarding automatic sharing of media associated with the event, to detect an affirmative user input to the response option and an affirmative user input to at least one of the one or more mode options, to determine that the user of the mobile communications device is present at the event, and in response, to share information to and from the mobile communications device in accordance with the at least one mode option, wherein the one or more mode options further include a discovery mode, wherein the mobile communications device is authorized to share media gathered by the mobile communications device during or prior to the event with other accepting users that are not known contacts of the user, the selection of the discovery mode causing the mobile communications device to be discoverable to unknown devices and share credentials with unknown devices during the event time at the event location.

2. The mobile communications device in accordance with claim 1, wherein the one or more mode options include an automatic notification mode wherein the mobile communications device is authorized to notify other accepting users of the presence at the party of the user and to receive notifications from devices associated with the other accepting users that they have arrived at the event.

3. The mobile communications device in accordance with claim 1, wherein the one or more mode options include a contacts mode wherein the mobile communications device is authorized to share media gathered by the mobile communications device during the event with other accepting users that are known contacts of the user.

4. The mobile communications device in accordance with claim 1, wherein the processor is configured to make the mobile communications device discoverable by broadcasting a MAC (media access control) of the mobile communications device.

5. The mobile communications device in accordance with claim 1, wherein the invitation is received via one of a social site, an email, a message, an online hangout or a calendar events.

6. The mobile communications device in accordance with claim 1, wherein the processor is further configured to enable a microphone of the mobile communications device during the event time at the event location to capture and extract information from audible signals.

7. The mobile communications device in accordance with claim 6, wherein the audible signals convey at least one of a name, a title, an arrival, a word, a voice and an unspoken noise.

8. A method of providing event media distribution associated with an event to a user of a mobile communications device, the method comprising:
   receiving at the mobile communications device an electronic invitation to the event, the event having a time and location associated therewith;
   displaying the electronic invitation, including a response option and one or more mode options, each mode option being associated with one or more rules regarding automatic sharing of media associated with the event, wherein the one or more mode options include a discovery mode wherein the mobile communications device is authorized to share media gathered during the event with other accepting users that are not known contacts of the user, wherein selection of the discovery mode cause the mobile communications device to be discoverable to, and share credentials with, unknown devices during the event time at the event location;
   detecting an affirmative user input to the response option;
   detecting an affirmative user input to at least one of the one or more mode options;
   determining that the user of the mobile communications device is present at the event; and
   in response to determining that the user of the mobile communications device is present at the event, sharing information to and from the mobile communications device in accordance with the at least one mode option.

9. The method in accordance with claim 8, wherein the one or more mode options include an automatic notification mode wherein the mobile communications device is authorized to notify other accepting users of the presence at the party of the user and to receive notifications from devices associated with the other accepting users that they have arrived at the event.

10. The method in accordance with claim 8, wherein the one or more mode options include a contacts mode wherein the mobile communications device is authorized to share media gathered by the mobile communications device during the event with other accepting users that are known contacts of the user.

11. The method in accordance with claim 8, wherein the mobile communications device becomes discoverable by exposing a MAC (media access control) address.

12. The method in accordance with claim 8, wherein receiving the invitation comprises receiving the invitation via one of a social site, an email, a message, an online hangout or a calendar event.

13. The method in accordance with claim 8, further comprising enabling a microphone of the mobile communications device during the event time at the event location to capture and extract information from audible signals at the event.

14. The method in accordance with claim 13, wherein the audible signals convey at least one of a name, a title, an arrival, a word, a voice and an unspoken noise.

* * * * *